(12) United States Patent
Herold

(10) Patent No.: US 8,695,789 B2
(45) Date of Patent: Apr. 15, 2014

(54) CONVEYOR BELT CONNECTOR

(75) Inventor: Wolfgang Herold, Offenbach (DE)

(73) Assignee: MATO Maschinen-und Metallwarenfabrik Curt Matthaei GmbH & Co. KG, Offenbach (DE)

(*) Notice: Subject to any disclaimer, the term of this patent is extended or adjusted under 35 U.S.C. 154(b) by 254 days.

(21) Appl. No.: 13/179,586

(22) Filed: Jul. 11, 2011

(65) Prior Publication Data

US 2012/0018285 A1    Jan. 26, 2012

(30) Foreign Application Priority Data

Jul. 23, 2010  (EP) ..................................... 10007667

(51) Int. Cl.
  *B65G 17/00*  (2006.01)
  *F16G 3/00*  (2006.01)
(52) U.S. Cl.
  CPC ........................................ *F16G 3/00* (2013.01)
  USPC ..................................................... 198/844.2
(58) Field of Classification Search
  USPC ...................................................... 198/844.2
  See application file for complete search history.

(56) References Cited

U.S. PATENT DOCUMENTS

| | | | | |
|---|---|---|---|---|
| 2,068,826 | A | * | 1/1937 | Timmerbeil .................... 24/33 C |
| 5,048,675 | A | * | 9/1991 | Nadalutti ..................... 198/844.2 |
| 6,627,045 | B2 | * | 9/2003 | Raczkowski et al. ......... 162/348 |
| 6,896,124 | B2 | | 5/2005 | Herold |
| 7,762,390 | B2 | * | 7/2010 | Suelzle ....................... 198/844.2 |
| 2011/0100896 | A1 | * | 5/2011 | Herold ........................... 210/251 |

FOREIGN PATENT DOCUMENTS

| | | |
|---|---|---|
| EP | 1338825 | 2/2002 |
| EP | 2123934 | 11/2009 |
| GB | 102339 | 11/1916 |
| GB | 440514 | 1/1936 |
| WO | 2007025567 | 3/2007 |

* cited by examiner

*Primary Examiner* — William R Harp
(74) *Attorney, Agent, or Firm* — Price Heneveld LLP

(57) ABSTRACT

A conveyor belt connector has a plurality of wire hooks arranged in a pre-defined relationship. A strip shaped substrate has slots in which the loops of the wire hooks are received. The strip is shaped to completely cover the shanks of the wire hooks, and includes an adhesive layer on the interior side thereof in which the shanks of the wire hooks are imbedded prior to assembly on a conveyor belt to retain the same in their predefined relationship.

12 Claims, 1 Drawing Sheet

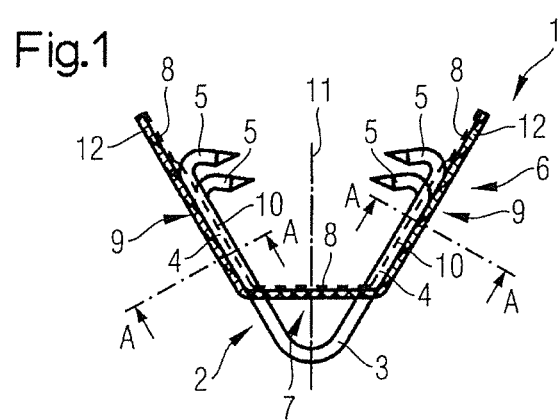
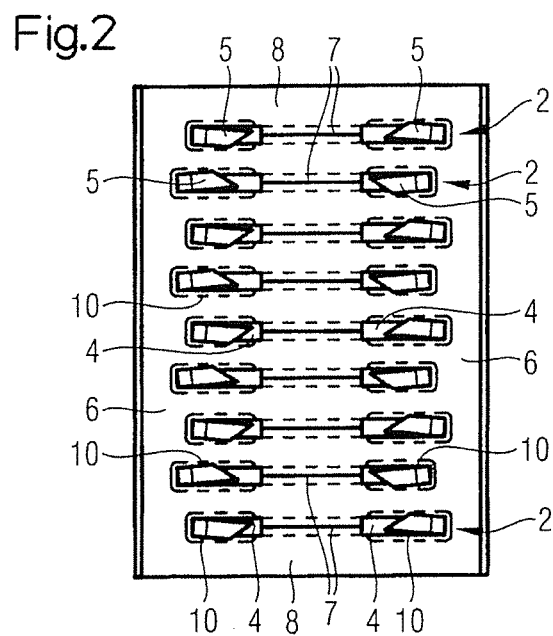
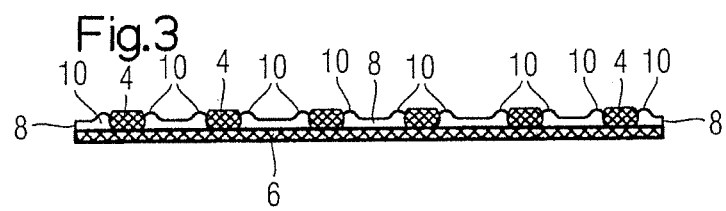

CONVEYOR BELT CONNECTOR

CLAIM OF PRIORITY

Applicants hereby claim the priority benefits under the provisions of 35 U.S.C. §119, basing said claim of priority on European Patent Application Serial No. 10007667.8, filed Jul. 23, 2010. In accordance with the provisions of 35 U.S.C. §119 and Rule 55(b), a certified copy of the above-listed European patent application will be filed before grant of a patent.

BACKGROUND OF THE INVENTION

The present invention relates to a connector element having individual wire hooks arranged adjacent to one another for attaching to one end of a conveyor belt. Each wire hook has a loop region, shanks that are connected to the loop region, and angled tips that are connected to the shanks. The connector element also has a strip-like substrate for holding the wire hooks. The substrate is provided with apertures arranged parallel to one another for receiving the wire hooks therein. The loop region of each wire hook is gripped in an associated one of the apertures. The connector element also has an adhesive layer that is applied to that side of the substrate which faces the shanks of the wire hooks.

To connect two ends of a conveyor belt, one connector element is attached to each end of the conveyor belt. Once the connector elements have been connected to the belt ends, the belt ends are positioned such that the loop regions mesh. A coupling rod is then inserted into the overlap loop regions of the two connector elements, so that the two ends of the belt are securely interconnected.

In order for the wire hooks to be properly attached to each end of the conveyor belt, the individual wire hooks must be precisely positioned relative to one another in a pre-defined parallel arrangement. This position must be maintained from the time the connector elements are produced until they are attached to the end of a belt. In most cases, this is accomplished by means of a transverse wire that is rigidly connected to the individual wire hooks, and thus positively positions them relative to one another as necessary. EP 1 338 825 A1 describes such an arrangement, for instance.

In some applications, it may be desirable to cover the wire hooks after they have been attached to the end of an associated conveyor belt. The cover may be either to protect the metal wire hooks from wear caused by the material transported on the belt, or to ensure that the materials on the transport belt are not damaged by the wire hooks. Thus, especially when the belt is moved in a concave belt guide and/or must move through a plurality of deflection rollers, there is a risk that one or more of the wire hooks will break. Also, in a connection in which a transverse wire is used to position the wire hooks relative to one another, there is a risk that the transverse wire will break, and broken ends of the wire hooks will project beyond the transport plane of the belt.

EP 1 338 825 A1 describes a connector element for attaching to one end of a conveyor belt having features like those discussed above. In the specifically illustrated exemplary embodiment of EP 1 338 825 A1, a transverse wire is used to position the wire hooks. Prior to attaching the connector element to the end of a conveyor belt, the wire hooks are arranged parallel to one another and supported only in the aperture of the strip-like substrate. The adhesive layer that is applied to the substrate does not contact the shanks of the wire hooks or completely cover them and the region of the conveyor belt that is adjacent to the angled tips of the wire hooks, until the connector element is attached to the belt end, that is, when the positioning jaws of the clamping apparatus close and deform or clench the wire hooks.

A connector element for a similar application is described in WO 2007/025567 A1, but this design does not use a transverse wire for positioning the individual wire hooks. Instead, the substrate or carrier strip is provided with three parallel rows of apertures, rather than just one row of apertures, as disclosed in EP 1 338 825 A1. The loop regions of the wire hooks pass through the center row of apertures, and the shanks of the wire hooks pass through the outer rows of apertures. Each wire hook is consequently gripped or retained in the regions of the three substrate apertures. In this connector element, the side of the substrate that faces the belt is provided with an adhesive layer that contacts the conveyor belt when the connector element is attached to the conveyor belt, similar to the EP 1 338 825 A1 connector. However, because of the three rows of apertures in the substrate, the substrate does not completely cover the wire hooks in the regions of the two outer rows of apertures.

SUMMARY OF THE INVENTION

One object of the present invention is to create a connector element of the type discussed above in which the wire hooks are securely held prior to the connector element being attached to the belt end, but without using a transverse wire, and without any additional apertures in the substrate for receiving the shanks of the wire hooks.

The object is attained in that the substrate completely covers exterior sides of the shanks of the wire hooks that face away from the conveyor belt, and in that the shanks of the wire hooks are embedded in the adhesive layer to create a positive fit and retention.

Thus, in the present inventive connector element, it is essential that the substrate with the adhesive layer is in a position in which the shanks of the wire hooks are completely covered by substrate and adhesive layer, even before the connector element is attached to the end of the conveyor belt. Therefore, the adhesive layer contacts the wire hooks in the shank regions. In accordance with the present invention, the shanks of the wire hooks are securely retained in place prior to assembly because they are embedded in the adhesive layer to create a positive fit. The shanks of the wire hooks, and therefore the wire hooks themselves, are held securely with respect to the substrate in cooperation with their inserted position in the apertures of the substrate, because of this positive-fit embedding. Thus, it is ensured that the substrate and the wire hooks assume a pre-defined, secure position relative to one another after the connector element is produced, when a plurality of connector elements are packed and stored and are ready to be shipped to the user. Consequently, it is not necessary to connect the wire hooks by means of a transverse wire or additional apertures in the substrate in order to retain the shanks of the wire hooks in their predefined position. The adhesive layer encloses the shanks of each wire hook with a bulge-like projection on the outward sides of the shanks, thus positively positioning each wire hook in the substrate, and therefore ensuring that all wire hooks are properly positioned on the substrate. The wire hooks are effectively prevented from tilting about the axis of the apertures in the substrates by this positive-fit embedding of the wire hooks in the adhesive layer.

A particularly secure positive fit occurs between the wire hooks and the adhesive layer when the sectional shape of the wire hooks is particularly well suited for creating the positive fit. One such sectional shape, which is particularly simple to produce, is a rectangular transverse cross-sectional shape for the wire hook. If, proceeding from the adhesive layer, the height of the wire hook is shorter than the width of the wire hook, there is a relatively large contact surface for the shank of the wire hook with respect to the adhesive layer and the substrate. The latter is the case when each shank is pressed with relatively high pressure into the adhesive layer down to the substrate during production of the connector element, deforming the adhesive layer, such that the shank is embedded in the adhesive layer and creates a positive fit laterally between each shank. The wire hook may certainly have a different sectional shape, as well, e.g. a circular shape.

The adhesive layer in the region of the individual shanks should bulge outwardly at least until it is greater than the radius or side thickness of the shank section. The further the bulge extends away from the substrate, the better the shanks of the wire hook are held in place.

In order to improve adhesion between the adhesive layer and the shanks of the wire hooks, in accordance with one advantageous refinement of the present invention, it is provided that the shanks of the wire hooks are coated or otherwise provided with an adhesive agent, especially a primer.

The strip-like substrate is preferably a strip of textile or plastic. The connector element is especially advantageous for use in conveyor belts for industrial laundry equipment, and the like. A plurality of adjacently arranged conveyor belts are used to convey pieces of laundry. The pieces of laundry, which are for instance terrycloth towels, are conveyed on a belt to an ironing station and then to a folding station.

The adhesive layer is preferably formed by an adhesive that is a hot melt adhesive, especially a thermoplastic hot melt adhesive.

Additional features of the present invention are depicted in the subordinate claims, the description of the drawings, and the drawings themselves. It should be noted that all individual features and all combinations of individual features are part of the present invention.

These and other advantages of the invention will be further understood and appreciated by those skilled in the art by reference to the following written specification, claims and appended drawings.

BRIEF DESCRIPTION OF THE DRAWINGS

The invention is depicted in the drawing using one exemplary embodiment, but shall not be limited by this exemplary embodiment.

FIG. 1 is a side view of the inventive connector element;

FIG. 2 is a top view of the connector element depicted in FIG. 1;

FIG. 3 depicts sections A-A according to FIG. 1, wherein the angled tips of the wire hooks are not depicted in the drawing.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The connector element 1 depicted in the figures attaches to one end of a conveyor belt (not shown). Refer to the disclosure of EP 1 338 825 A1 in this regard.

The illustrated connector element 1 has individual wire hooks 2 that are arranged laterally adjacent to one another in a mutually parallel relationship. In the section of the specific exemplary embodiment depicted, there are nine wire hooks 2 spaced laterally equidistantly. Each hook 2 has a loop region 3, shanks 4 connected to outer areas of loop region 3 that are of unequal length, and angled tips 5 connected to outer portions of the shanks 4. The two tips 5 of each wire hook 2 point towards one another. The two shanks 4 together create an acute included angle. Each shank 4 and the tip 5 associated with it also create an acute included angle. The wire hooks 2 are arranged alternating, i.e., with respect to each half of the wire hook 2, with a short shank for a wire hook that is followed by a long shank for the next wire hook. Each wire hook 2 has an essentially rectangular lateral cross-sectional shape. As can be seen in particular from the sectional depiction of the wire hooks 2 in FIG. 3, the shorter sides of shanks 4 bulge outward somewhat, so that the lateral cross-sectional shape of the wire hook is only generally rectangular, since the shank edge corners are rounded or tapered.

The illustrated connector element 1 also has a strip-like carrier or substrate 6 for receiving and retaining the wire hooks 2. The strip-like substrate 6 is especially a textile strip. The substrate 6 is provided with a number of elongate slots or apertures 7 arranged parallel to one another, which are equal to the number of wire hooks 2 to be received therein. The loop region 3 of each wire hook 2 is inserted into an associated one of the apertures 7 and thus gripped and captured therein. An adhesive layer 8 is applied to the side of the substrate 6 that faces the shanks 4. The adhesive layer 8 is preferably a thermoplastic hot melt adhesive. The shanks 4 of the wire hooks 2 are provided with an adhesive, especially a primer, at least on those sides that face the adhesive layer 8, and also on those sides that face the laterally adjacent wire hook 2.

During the final production process step for the connector element 1, after the wire hooks 2 have been inserted into the apertures 7 of the substrate 6, the substrate 6 is heated, at least in the regions of outer segments 9, and the wire hooks 2 are also heated. The outer segments 9 of the substrate 6 are pressed against the shanks 4 of the wire hooks 2 that have been previously coated with an adhesive or primer. The thermoplastic adhesive layer 8 deforms because it has been heated, and the shanks 4 of the wire hooks 2 are embedded into the adhesive layer 8 in a positive fit. During the pressing process, bulges 10 form in the regions of the individual shanks 4. The adhesive layer 8 bulges at least past the radius or sides of the shank 4, as can be seen in FIG. 3. The substrate 6 thus completely covers the shanks 4 on their exterior side, that is, the sides that face away from the axis 11, and the ends 12 of the substrate 6 project beyond the ends of the shanks 4 for the wire hooks 2 that face the tips 5. Thus, each wire hook 2 is gripped in the aperture 7 associated with this wire hook 2 and by the bulges 10 arranged bilateral to each shank in the regions of the shanks 4 before the connector element 1 is attached to the end of the conveyor belt. The bilateral bulges positively prevent the wire hooks 2 from tilting, and in addition secure the glued connection between shanks 4 and adhesive layer 8, such that the shank 4 cannot detach from the adhesive layer 8 and/or the substrate 6 in the direction in which the tips 5 extend.

When the connector element 1 is attached to the end of a conveyor belt, the shanks 4 are clenched or moved toward one another in a known manner by the exertion of pressure onto the connector element 1. The tips 1 grip into the conveyor belt to produce the interconnection of connector element 1 and conveyor belt. This final connection or assembly process is made while heat is applied to connector element 1, so that the thermoplastic adhesive in adhesive layer 8 deforms. The shanks 4 of the wire hooks are completely covered by the substrate 6, the substrate 6 adheres to the outside surfaces of the conveyor belt, even in the region of its ends 12, and the shanks 4 of wire hooks 2 are completely covered and embedded in adhesive layer 8 as well.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A conveyor belt connector comprising:
   a plurality of individual wire hooks arranged in a mutually parallel, laterally spaced apart, predefined relationship; each of said wire hooks having a loop portion, first and second shank portions connected with outer areas of said loop portion and each having both an exterior rear surface facing away from an associated conveyor belt and opposite exterior side surfaces oriented generally perpendicular to said rear exterior surface, and angled tips connected with outer areas of said shanks and shaped for engagement in the conveyor belt;
   a strip shaped substrate supporting and covering said wire hooks, and having a plurality of through apertures arranged in a mutually parallel relationship which closely receive said wire hooks therein, whereby said loop portion of each said wire hooks protrudes through an associated one of said through apertures, and is gripped and thereby retained in the associated one of said through apertures; said strip shaped substrate having an interior surface which faces toward and is disposed adjacent to said exterior rear surface of each of said shank portions of said wire hooks;
   an adhesive layer disposed on said interior surface of said strip shaped substrate, and having a thickness that is sufficient to cover both said exterior rear surface and at least a portion of each of said exterior side surfaces of said first and second shank portions of said wire hooks; and wherein
   said strip shaped substrate with said adhesive layer thereon completely covers both said exterior rear surface and said portions of said exterior side surfaces of each of said shank portions of each of said wire hooks; and
   said exterior rear surface and said portions of said exterior side surfaces of each of said shank portions of each of said wire hooks are fully embedded along the entire length thereof in said adhesive layer prior to assembly onto the conveyor belt to positively retain said wire hooks in said predefined relationship both before and after said connector is assembled onto the conveyor belt.

2. A conveyor belt connector as set forth in claim 1, wherein:
   said wire hooks have a generally rectangular or generally circular transverse cross-sectional shape.

3. A conveyor belt as set forth in claim 2, wherein:
   said adhesive layer bulges at least beyond the radius or sides of said shank portions.

4. A conveyor belt connector as set forth in claim 3, wherein:
   said adhesive layer comprises a thermoplastic hot melt adhesive.

5. A conveyor belt connector as set forth in claim 3, wherein:
   said shank portions of said wire hooks have an adhesive primer thereon.

6. A conveyor belt connector as set forth in claim 1, wherein:
   said shank portions of each of said wire hooks are unequal in length.

7. A conveyor belt connector as set forth in claim 1, wherein:
   said strip-like substrate comprises a strip of textile or plastic.

8. A conveyor belt connector as set forth in claim 1, wherein:
   said shank portions of said wire hooks have an adhesive primer thereon.

9. A conveyor belt as set forth in claim 1, wherein:
   said adhesive layer bulges at least beyond the radius or sides of said shank portions.

10. A conveyor belt connector as set forth in claim 1, wherein:
    said adhesive layer comprises a thermoplastic hot melt adhesive.

11. A conveyor belt connector as set forth in claim 1, wherein:
    said wire hooks have a generally rectangular transverse cross-sectional shape.

12. A conveyor belt as set forth in claim 11, wherein:
    said adhesive layer bulges at least beyond the radius or sides of said shank portions.

* * * * *